United States Patent
Rogers et al.

(10) Patent No.: US 7,383,855 B2
(45) Date of Patent: Jun. 10, 2008

(54) SANITARY TANK VENT VALVE

(75) Inventors: Clint M. Rogers, Ellsworth, KS (US);
Jerold L. Hlad, Sylvan Grove, KS (US); Joe D. Dumoit, Spring, TX (US)

(73) Assignee: Cashco, Inc., Ellsworth, KS (US)

( * ) Notice: Subject to any disclaimer, the term of this patent is extended or adjusted under 35 U.S.C. 154(b) by 272 days.

(21) Appl. No.: 11/299,863

(22) Filed: Dec. 12, 2005

(65) Prior Publication Data
US 2007/0131283 A1 Jun. 14, 2007

(51) Int. Cl.
*F16K 17/26* (2006.01)
(52) U.S. Cl. ................................. 137/493.8; 137/526
(58) Field of Classification Search ................. 137/493, 137/493.8 I, 526 X, 493.7, 493.9, 526; 220/203.02
See application file for complete search history.

(56) References Cited

U.S. PATENT DOCUMENTS

| | | | | |
|---|---|---|---|---|
| 1,531,273 A | * | 3/1925 | Clifford et al. | 137/493.8 |
| 1,650,150 A | * | 11/1927 | Nelson | 137/493.8 |
| 1,669,739 A | * | 5/1928 | Clark | 137/493.8 |
| 1,918,807 A | * | 7/1933 | Glab | 220/203.02 |
| 2,405,241 A | * | 8/1946 | Smith | 137/526 |
| 2,526,019 A | * | 10/1950 | Fowler | 137/493.9 |
| 3,814,123 A | * | 6/1974 | Cook | 137/493.9 |
| 4,760,863 A | * | 8/1988 | Broer | 137/493.8 |
| 5,474,351 A | | 12/1995 | Ligh | |
| 5,511,581 A | | 4/1996 | Ligh | |
| 5,671,952 A | | 9/1997 | Ligh | |

* cited by examiner

*Primary Examiner*—Stephen M Hepperle
(74) *Attorney, Agent, or Firm*—Kenneth H. Johnson

(57) ABSTRACT

A combination pressure relief and vacuum relief valve for mounting on a storage tank is disclosed as having two vertical mounting connections of different elevations; a pressure relief valve mounted on one connection; and a vacuum relief valve mounted on the other connection such that said vacuum relief valve is higher in elevation than said pressure relief valve. The valve is sanitary for use in food and pharmaceutical production and storage and has highly polished surfaces to prevent processed material from sticking. The valve also includes special sloping surfaces in the body and connections to prevent processed material from standing in the valves. The pressure valve and vacuum valve may be removed separately or rotated separately for mounting. The combination valve may be attached on storage tanks or other vessels or conduits.

13 Claims, 2 Drawing Sheets

SANITARY TANK VENT VALVE

BACKGROUND OF THE INVENTION

1. Field of the Invention

The present invention generally relates to tank venting valves for relieving the internal pressure or vacuum in tanks at a predetermined pressure/vacuum. More particularly this invention relates to weight/spring loaded tank vents. More particularly the invention relates to tank venting valves for use in sanitary service for processing food and pharmaceuticals.

2. Related Art

The basic valve design is known as a "weight loaded tank vent". The design utilizes a weighted cover over a nozzle. The cover, also known as a pallet, forms a barrier to the nozzle opening. The weight of the pallet determines at what pressure the pallet will lift open to relieve pressure in the tank. The opening pressure is known as the "set pressure". The set pressure can easily be determined by dividing the weight of the pallet assembly by the open area of the nozzle. If a higher set pressure is desired, more weight is added to the pallet.

Another type of pressure relieving device is a spring loaded tank vent. The spring loaded type is used for set pressures above that which is practical for weight loaded operation due to either a high set pressure and there is not enough room for the weights on the pallet or where the size of the vent nozzle dictates a large weight on the pallet.

A third type of tank vent is pilot operated. Pilot operated tank vents utilize the tank pressure acting on an area larger than the nozzle area to create a higher downward force to hold down a pallet or seat plate against the tank pressure. For this reason pilot operated tank vents seal tighter than weight or spring loaded vents until the set or opening pressure is reached. The set pressure is adjustable by means of a spring in the pilot.

SUMMARY OF THE INVENTION

Briefly the present invention is a combination pressure relief and vacuum relief valve module for mounting on a storage tank. The valve is sanitary for use in food and pharmaceutical production and storage and has highly polished surfaces to prevent the material being processed from sticking and allowing growth of bacteria or fungus. The valve also includes special self draining sloped surfaces in the body and connections to prevent liquid from standing in the valves. Briefly the valve is modular in design and comprises:

a sanitary manifold in the form of a tee fitting having mounting connections at two different elevations a pressure relief valve mounted on a lower connection and a vacuum relief valve mounted on an upper connection.
Preferably the connections are vertical.

Preferably the valve is modular in design and comprises:

a sanitary manifold in the form of a tee fitting having a vertical mounting connection and a horizontal mounting connection;

a pressure relief valve mounted on said vertical mounting connection;

a ninety degree elbow connected to said horizontal mounting connections; and a vacuum relief valve mounted vertically on said ninety degree elbow such that said vacuum relief valve is higher in elevation than said pressure relief valve.

In a preferred embodiment the relief valve comprises:

a valve body having a seat at the lower end thereof;

a weighted pallet moveably mounted within said body and having a diaphragm seal on the under side for engagement with said seat;

a guidepost mounted on the top side of the pallet;

a pallet weight removably placed on the top side of said pallet;

a ninety degree elbow connected to said horizontal mounting connections; and the vacuum relief valve comprises:

a vacuum relief valve body;

a seat assembly mounted on said valve body having a seat on the underside thereof; and a seal plate held in sealing engagement with said seat by a spring mounted on said seat assembly and connected to said seal plate by an adjuster and having a diaphragm seal thereon adjacent to said seat.

DETAILED DESCRIPTION OF THE PREFERRED EMBODIMENT

Figure 1:
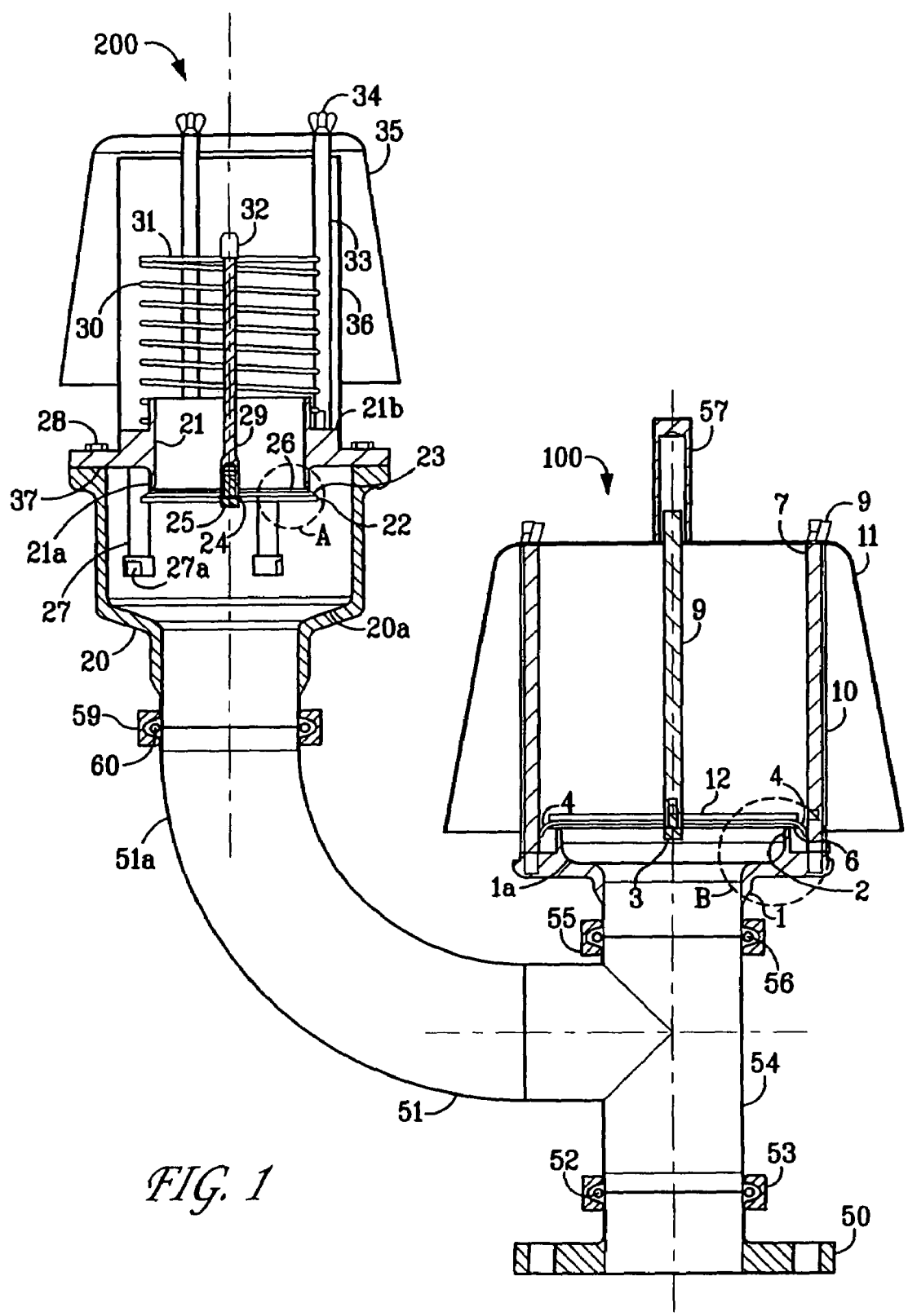
FIG. 1 is a side elevational view in cross section of the preferred embodiment of the invention.
Figure 2:
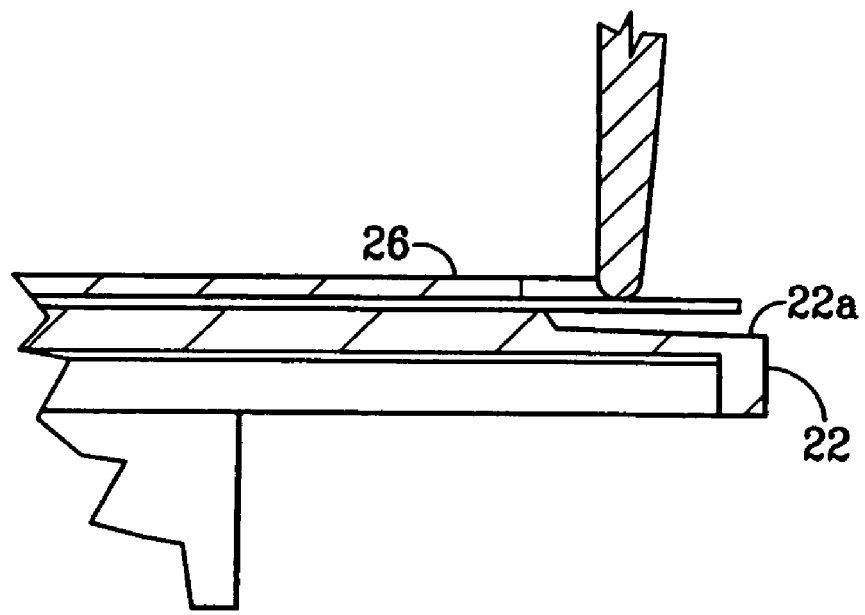
FIG. 2 is a detail side elevational view of the area "A" in FIG. 1.
Figure 3:
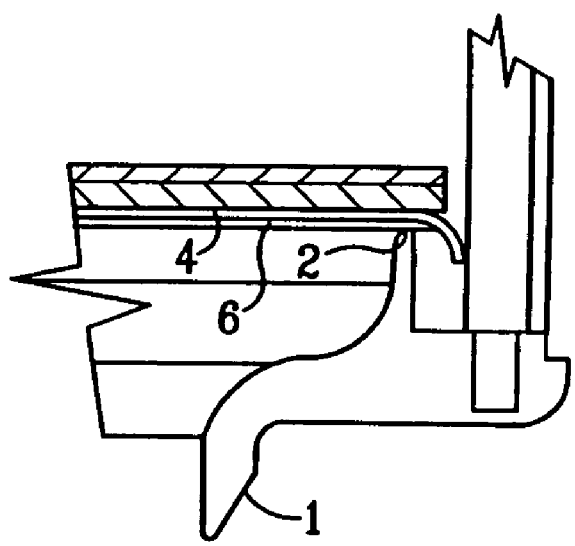
FIG. 3 is a detail side elevation view of the area "B" in FIG. 1.

Referring now to the FIG. 1 there is shown a combined tank pressure relief/vacuum relief valve module as mounted on a tank. A sanitary manifold in the form of a ninety degree tee fitting 54 having a pressure vent attached to a lower vertical arm 54*a*, a pressure vent connection in the form of an upper vertical arm 54*b* and vacuum vent connection in the form of an horizontal arm 54*c* which is connected to the tank flange adapter 50 by a sanitary clamp 53 on the lower vertical arm 54*a* and with a sanitary gasket 52 between the flange adapter 50 and the lower vertical arm 54*a*. The pressure relief valve shown generally at 100 is shown to have a body 1 which is connected to upper vertical arm 54*b* (pressure vent connection) by sanitary clamp 55 and sanitary gasket 56. The body 1 has an annular diaphragm seat 2, comprising a lip in the body 1, extending around the lower end or inlet 1*a*. Pallet guides 7 are threaded into body 1 with hood 11 secured on the upper end thereof by wing nuts 8. The diaphragm 6 is held in place by retainer 5 on the under side of the pallet 4 and rest on the diaphragm seat 2. A pallet weight(s) 12 is placed on the upper surface of the pallet 4 and is selected according to the desired set pressure and the pallet area. A guide post 9 is attached to the upped surface of the pallet 4 by cap screw 3 and washer 62 through the retainer 5, and extends into guide post receptacle 57. The pallet 4 and weight 12 rise when the pressure in the tank reaches the set pressure unseating the diaphragm 6 from the diaphragm seat 2 relieving the pressure in the tank.

The vacuum relief valve shown generally at 200 comprises a body 20 which is connected to vacuum vent connection on the upper end of ninety degree elbow 51 by sanitary clamp 59 and sanitary gasket 60. Seat assembly 21 is connected to body 20 by cap screws 28 with a seal provided by a tetra flouro ethane polymer rope seal 37. Seat assembly 21 includes seat 21*a* at the lower end of the seat assembly. Adjuster 29 is secured to the retainer 26 and the upper surface of seat plate 22 by cap screw 25 and washer 24. The diaphragm seal 23 is held in place by retainer 26.

The diaphragm seat 23 secured to the upper surface of seat plate 22 is held against seat 21a by the tension of spring 30. A retainer 31 is held between the upper end of spring 30 and nut 32 and provides a surface at its upper end against which the spring is tensioned. Spring 30 is mounted at the lower end on shoulder 21b in seat assembly. The desired vacuum relief is achieved by adjusting the tension on the spring using nut 32 on the adjuster 29. Spring stud guides 33 are mounted on seat assembly 21 with hood 35 and screen 36 held in place by wing nuts 34 which are threaded onto spring stud guides 33. Guide posts 27 for the seat plate 22 are secured to seat assembly 21 and have stops 27a at the lower end to limit the movement of the seat plate 22.

The main requirement for valves in sanitary service is that there are no places where processed material can collect and stand. Therefore, for an element to be "sanitary" as that terms is used herein requires that all of the surfaces which may contact food are finely polished, including a final electro polishing, to remove blemishes and pits. This requires that the beginning pieces are not sand cast but be produced by more advanced methods, such as die casting. In addition there must be no interior shelves that would allow processed material to collect. For example, one means to achieve this in the present invention is a downward bevel or slope is provided at throat 1a of the pressure relief valve and 20a of the vacuum relief valve. Thus, any process liquid that comes into contact with either valve will drain back into the tank. In addition the seat plate 22 in the vacuum relief valve 20 has an outwardly and downwardly sloped surface 22a all around its outer edge so that any liquid will drain back down into the tank.

To further protect the vacuum relief valve from contamination due to over fill the vacuum relief valve assembly 200 is at a higher elevation than the pressure relief valve assembly 100. This is achieved by sanitary manifold 51 having an upper arm (vacuum vent connection) 51a terminating above the pressure valve assembly 100.

The clamps and gaskets used to mount the two distinct valves onto the tee and ninety degree elbow provide a true modular unit. The pressure relief valve and vacuum relief valve may be removed and serviced separately. In addition the clamping mechanisms allow the entire unit or each valve individually to be rotated freely 360° to adapt the unit to space on a tank roof.

The invention claimed is:

1. A combination pressure relief and vacuum relief module comprising:
    a tee fitting having a vertical mounting connection and a horizontal mounting connection;
    a pressure relief valve mounted on said vertical mounting connection;
    a ninety degree elbow connected at one end to said horizontal mounting connection;
    the other end of said elbow being higher in elevation than said one end; and
    a vacuum relief valve mounted on the other end of said ninety degree elbow such that said vacuum relief valve is higher in elevation than said pressure relief valve.

2. The combination pressure relief and vacuum relief module according to claim 1 wherein said tee fitting is removably and rotatably securable to a tank roof.

3. The combination pressure relief and vacuum relief module according to claim 1 wherein said pressure relief valve is removably and rotatably securable to said vertical mounting connection.

4. The combination pressure relief and vacuum relief module according to claim 1 wherein said vacuum relief valve is removably and rotatably securable to said ninety degree elbow.

5. The combination pressure relief and vacuum relief module according to claim 1 wherein said pressure relief comprises;
    a pressure relief valve body having a diaphragm seat at the lower end thereof;
    a weighted pallet moveably mounted within said body and having a diaphragm seal on an under side thereof for engagement with said diaphragm seat;
    a guidepost mounted on a top side of said pallet; and
    a pallet weight removably placed on the top side of said pallet.

6. The combination pressure relief and vacuum relief module according to claim 5 wherein said body is made of die cast stainless and polished to remove surface blemishes.

7. The combination pressure relief and vacuum relief module according to claim 1 wherein said vacuum relief valve comprises:
    a vacuum relief valve body;
    a seat assembly mounted on said valve body having a seat on an underside thereof; and
    a seal plate held in sealing engagement with said seat by a spring mounted on said seat assembly and connected to said seal plate by an adjuster, said seal plate having a seal mounted thereon adjacent to said seat.

8. The combination pressure relief and vacuum relief module according to claim 7 wherein said seal plate has a downwardly and outwardly sloping outer edge.

9. the combination pressure relief and vacuum relief module according to claim 7 wherein said seal is held on said seal plate by a retainer which is secured to said seal plate by said adjuster.

10. The combination pressure relief and vacuum relief module according to claim 1 wherein all interior surfaces of said pressure relief and vacuum valves have downward slopes at all bore changes.

11. A combination pressure relief and vacuum relief module comprising:
    a tee fitting having a vertical mounting connection and a horizontal mounting connection;
    a pressure relief valve mounted on said vertical mounting connection said pressure relief comprising:
    a pressure relief valve body having a diaphragm seat at the lower end thereof;
    a weighted pallet moveably mounted within said body and having a diaphragm seal on an under side thereof for engagement with said diaphragm seat;
    a guidepost mounted on a top side of said pallet; and
    a pallet weight removably placed on the top side of said pallet;
    a ninety degree elbow connected at one end to said horizontal mounting connection;
    the other end of said elbow being higher in elevation than said one end; and
    a vacuum relief valve mounted on the other end of said ninety degree elbow such that said vacuum relief valve is higher in elevation than said pressure relief valve, said vacuum relief valve comprising:
    a vacuum relief valve body;
    a seat assembly mounted on said valve body having a seat on an underside thereof; and
    a seal plate held in sealing engagement with said seat by a spring mounted on said seat assembly and connected to said seal plate by an adjuster, said seal plate having a seal mounted thereon adjacent to said seat.

12. The combination pressure relief and vacuum relief module according to claim 11 wherein said seal plate has a downwardly and outwardly sloping outer edge.

13. The combination pressure relief and vacuum relief module according to claim 11 wherein all interior surfaces of said pressure relief and vacuum valves have downward slopes at all bore changes.

* * * * *